United States Patent [19]

Shieh

[11] Patent Number: 5,069,049

[45] Date of Patent: Dec. 3, 1991

[54] LOCK MECHANISM FOR A CYCLING VEHICLE

[76] Inventor: Yi C. Shieh, 58, Ma Yuan West Street, Taichung, Taiwan

[21] Appl. No.: 615,268

[22] Filed: Nov. 19, 1990

[51] Int. Cl.⁵ .............................................. B62H 5/16
[52] U.S. Cl. ........................................ 70/227; 70/233
[58] Field of Search ................................ 70/225–228, 70/233, 236, 237

[56] References Cited

U.S. PATENT DOCUMENTS

| 1,402,725 | 1/1922 | Pippen | 70/227 |
| 2,366,863 | 1/1945 | Lippow | 70/227 |
| 2,706,901 | 4/1955 | Jenkins | 70/227 |
| 4,180,998 | 1/1980 | Hellman | 70/227 |
| 4,459,833 | 7/1984 | Waterkamp et al. | 70/227 |

FOREIGN PATENT DOCUMENTS

| 0885082 | 9/1943 | France | 70/233 |
| 297925 | 6/1932 | Italy | 70/227 |
| 8701669 | 3/1987 | PCT Int'l Appl. | 70/233 |

Primary Examiner—Lloyd A. Gall

[57] ABSTRACT

A lock device includes a latch part and a block fixed to the fork portion of a motorcycle. A frame is engageable between the latch part and the block so as to lock the wheel of the motorcycle. The frame is rotatably coupled to a pair of supports which are rotatable about the block. When the supports are latched by a latch pin, the frame can be maintained in parallel to the fork portion so that the wheel is free to rotate. When the supports are released, the frame is rotatable and the free ends of the frame can be locked by the latch part. The lock device can be easily operated.

1 Claim, 6 Drawing Sheets

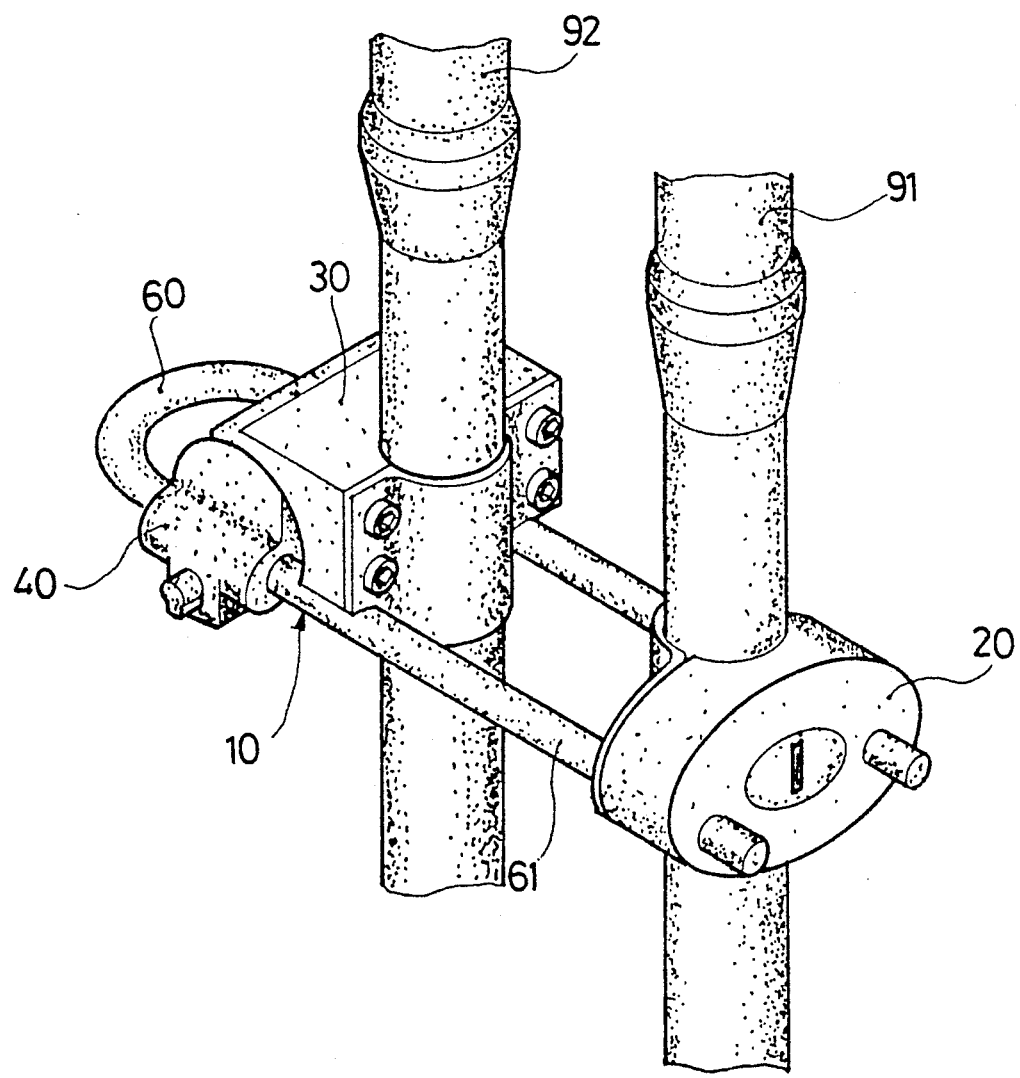
F I G. 2

LOCK MECHANISM FOR A CYCLING VEHICLE

BACKGROUND OF THE INVENTION

The present invention relates to a lock mechanism, and more particularly to a lock mechanism for a bicycle or a motorcycle.

A conventional lock device for a bicycle or for a motorcycle includes a U-shaped frame hooked to a front fork of a bicycle and a latch part engageable with the free ends of the legs of the frame so that the lock device can be retained in place in order to lock the front wheel. The lock device is made individually or separately so that the user has to find the lock device when it is desired to lock the motorcycle or the bicycle. This is inconvenient.

The present invention has arisen to mitigate and/or obviate the afore-described disadvantages of the conventional lock for bicycle or motorcycle.

SUMMARY OF THE INVENTION

The primary object of the present invention is to provide a lock mechanism which is directly fixed on the fork portion of the bicycle or the motorcycle so that the lock mechanism can be easily operated.

In accordance with one aspect of the present invention, there is provided a lock device which includes a latch part and a block fixed to the fork portion of a motocycle. A pair of supports are rotatably coupled to the block. A hole is vertically formed in each support for slidably receiving a pair of legs of a frame. A key hole is formed in one support and is aligned with a recess formed in the block. A spring and a catch are received within the recess. A latch pin is slidably received within the key hole. When the latch pin and the catch are biased by the spring so that the catch is engaged between the seat and one support, the supports can not rotate and the legs can not slide along the holes. When the latch pin is depressed into the key hole, the catch is pushed inward and received within the recess so that the supports are rotatable about the shaft, and the legs are slidable along the holes.

Further objectives and advantages of the present invention will become apparent from a careful reading of the detailed description provided hereinbelow, with appropriate reference to the accompanying drawings.

BRIEF DESCRIPTION OF THE DRAWINGS

FIG. 2 is an enlarged partial perspective view of the lock mechanism which is fixed on a front fork of the motorcycle in a lock position;

DETAILED DESCRIPTION OF THE INVENTION

Figure 1:
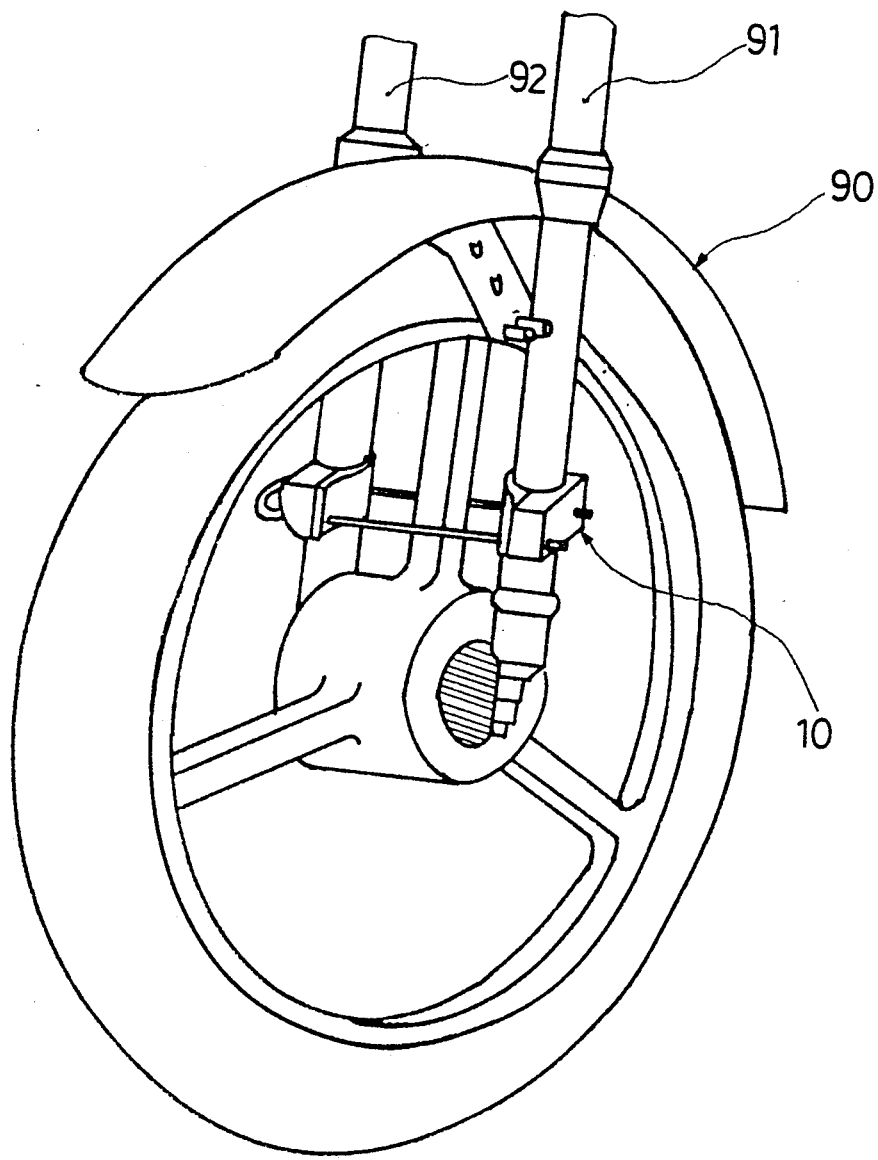
FIG. 1 is a partial perspective view of a front wheel of a motorcycle which employs a lock mechanism in accordance with the present invention.

Referring to the drawings and initially to FIGS. 1 and 2, the lock mechanism 10 in accordance with the present invention comprises generally a latch part 20 and a block 30 fixed to the limbs 91, 92 of a front fork of a motorcycle 90 or the like; and a U-shaped frame 60 slidably coupled to a pair of supports 40 which are rotatably supported on the block 30, the free ends of the legs 61 of the frame 60 can be locked by the latch part 20 so that the front wheel of the motorcycle is locked and can not move.

Figure 3:
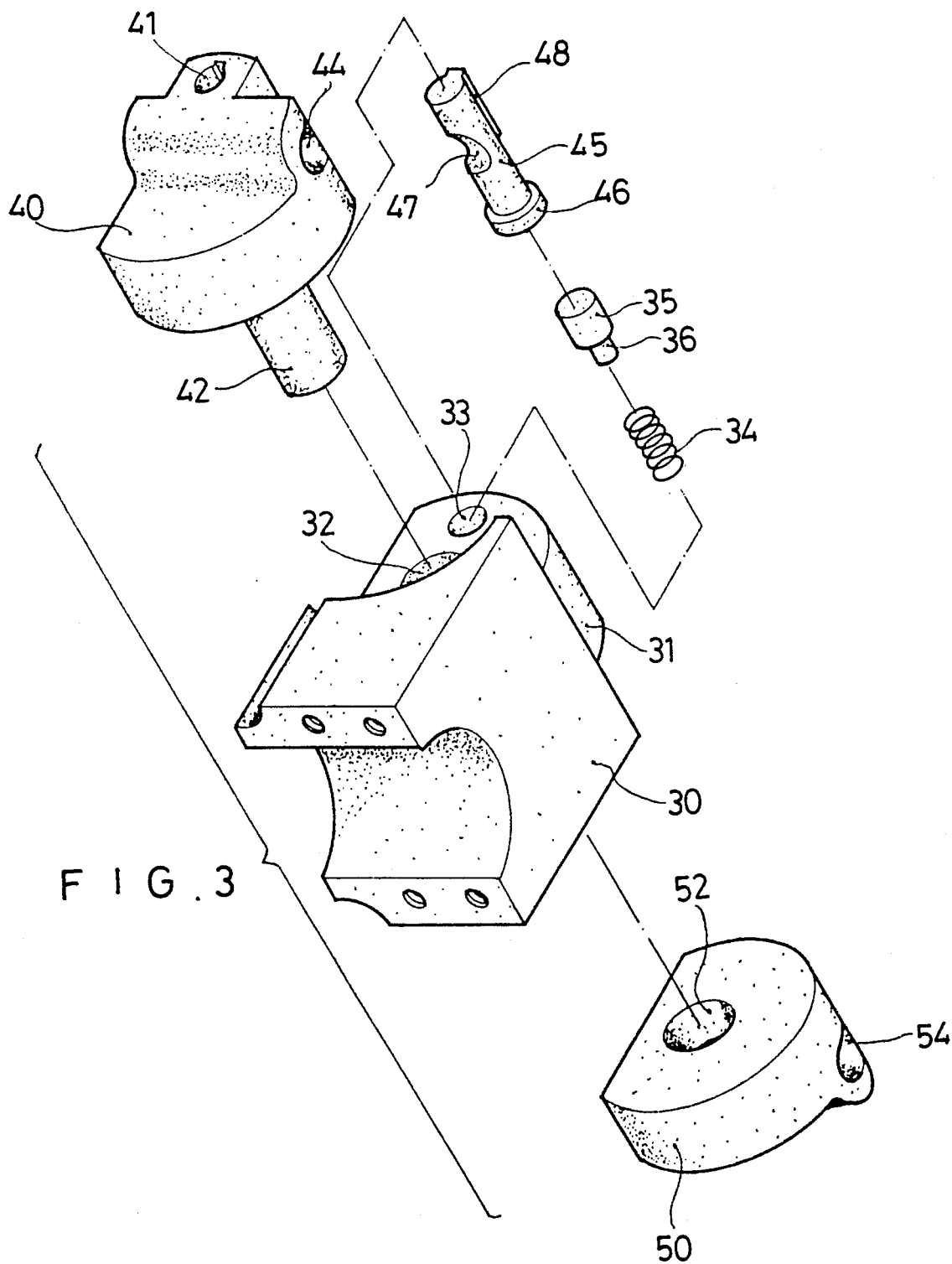
FIG. 3 is an exploded view of the lock mechanism.
Figure 4:
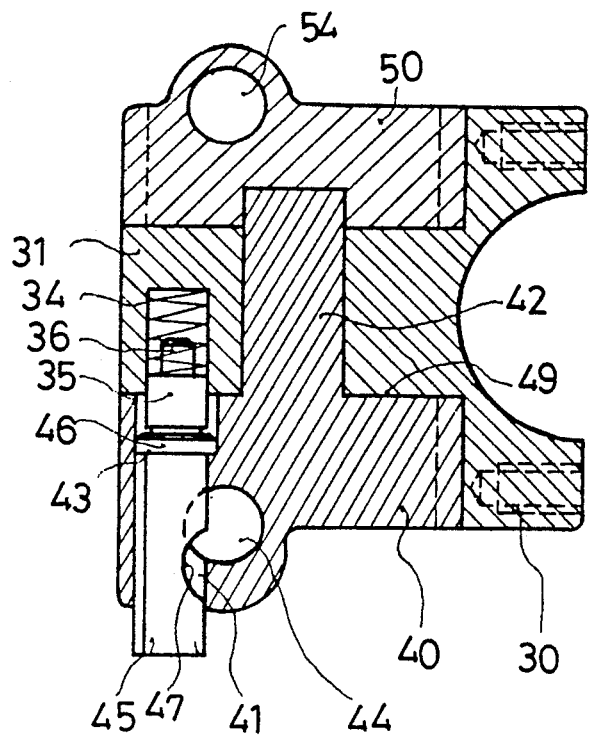
FIGS. 4 and 5 are cross sectional views illustrating an operation of the lock mechanism.

Referring next to FIGS. 3 and 4, an aperture 32 and a recess 33 which are substantially arranged in parallel with each other are laterally formed in a seat 31 which is integrally fixed to one side of the block 30. A shaft 42 has one end integrally fixed to one of the supports 40 and has another end force-fitted within an opening 52 of another support 50. The shaft 42 is rotatably supported within the aperture 32 so that the supports 40, 50 are rotatable about the shaft 42. A hole 44, 54 is vertically formed in each of the supports 40, 50 for slidably receiving the legs 61 of the frame 60. A key hole 41 is laterally formed in the support 40 and is arranged in parallel to the axis of the shaft 42. The distance between the key hole 41 and the shaft 42 is equal to the distance between the aperture 32 and the recess 33 so that the key hole 41 can be aligned with the recess 33 when the supports 40, 50 rotate to a suitable angle. As shown in FIG. 4, the key hole 41 is slightly intersected with the hole 44, and a shoulder 43 is formed in one end of the key hole 41 close to the seat 31.

A spring 34 and a catch 35 are received in the recess 33. It is preferable that a stub 36 is integrally fixed on one end of the catch 35 and is engaged with the spring 34. The catch 35 can be biased outward of the recess 33 by the spring 34. A latch pin 45 which has a key 48 formed on an end portion thereof has an enlarged head 46 formed on another end and engaged with the shoulder 43 when the latch pin 45 is slidably received within the key hold 41 of the support 40. A notch 47 which is curved is formed in the latch pin 45. The engagement of the key 48 with the key hole 41 prevents the latch pin 45 from rotating so that the notch 47 faces toward a predetermined direction.

Referring next to FIG. 4, when the latch pin 45 and the catch 35 are biased outward by the spring 34 and when the enlarged head 46 of the latch pin 45 is engaged with the shoulder 43, the catch 35 is engaged between the seat 31 and the support 40 so that the support 40 can not rotate about the shaft 42. At this moment, the latch pin 45 has a free end extending outward from the key hole 41, and part of the latch pin 45 is intersected with the hole 44 of the support 40.

Figure 5:
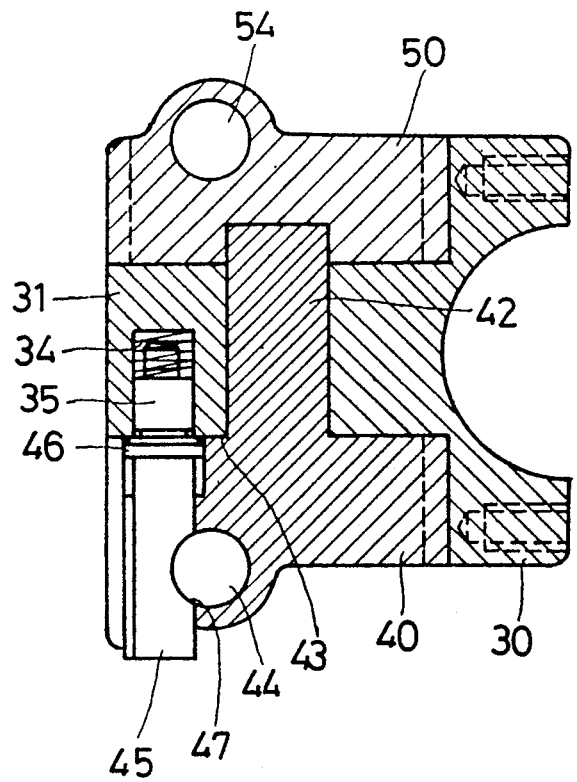

Referring next to FIG. 5, when the free end of the latch pin 45 is pushed inward into the key hole 41, the catch 35 is fully depressed into the recess 33. At this moment, the catch 35 is not engaged between the seat 31 and the support 40 so that the supports 40, 50 are freely rotatable about the shaft 42 again. When the supports 40, 50 are rotated so that the recess 33 and the key hole 41 are not aligned with each other, the catch 35 is biased by the spring 34 to contact the inner surface 49 of the support 40. At the position as shown in FIG. 5, the notch 47 is aligned with the hole 44 of the support 40 so that the legs 61 of the frame 60 are freely to slide along the holes 44, 54.

Figure 7:
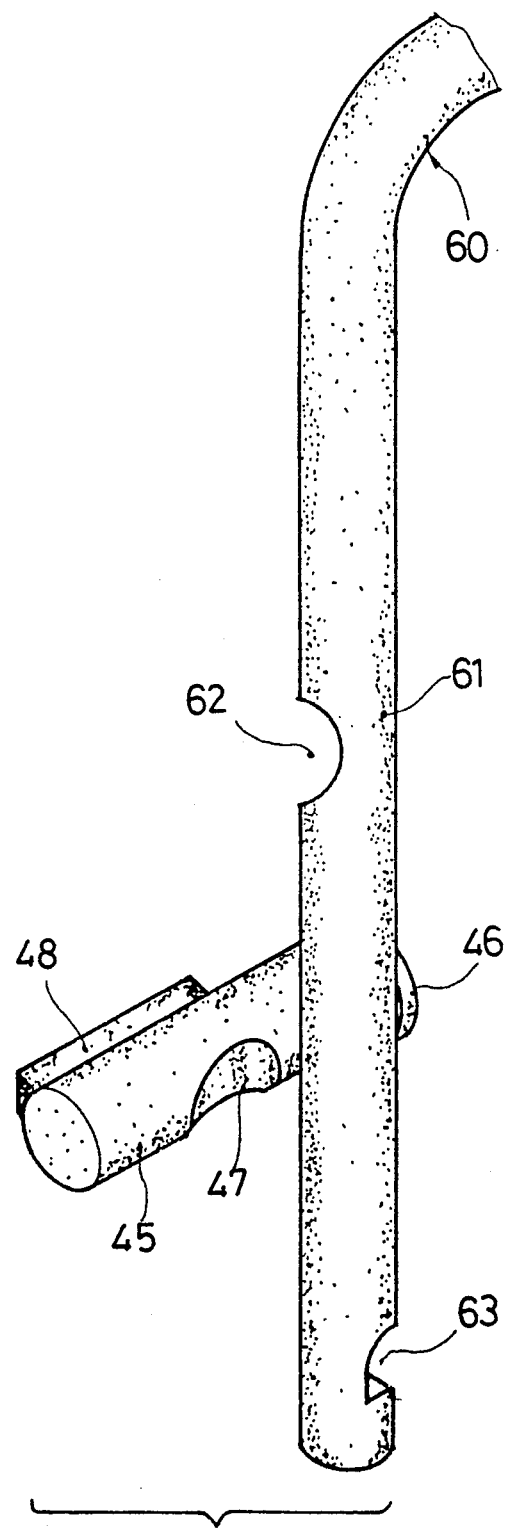
FIG. 7 is a partial perspective view illustrating the frame and a lock pin.

As shown in FIG. 7, a notch 62 is formed in the middle portion of a leg 61 of the frame 60. When the legs 61 of the frame 60 are pushed to slide along the holes 44, 54 until the notch 62 of the leg 61 is aligned with the latch pin 45, the latch pin 45 can move laterally relative to the leg 61 and can move to the position as shown in FIG. 4. However, when the catch 35 is still received within the recess 33 and is still biased to contact the inner surface 49 of the support 40, the latch pin 45 is not biased by the spring 34 so that the latch pin 45 is loosely received within the key hole 41. When the supports 40, 50 are rotated so that the recess 33 and the key hole 41 are aligned with each other again, the catch 35 and the latch pin 45 are biased by the spring 34 again to the position as shown in FIG. 4. At this moment, the notch 62 of the leg 61 is aligned with the latch pin 45 so that the latch pin 45 is allowed to be intersected with the hole 44 of the support 40 and so that the legs 61 can not slide along the holes 44, 54. Also at this moment, the catch 35 is engaged between the seat 31 and the support 40 again so that the supports 40, 50 can not rotate about the shaft 42.

Figure 6:
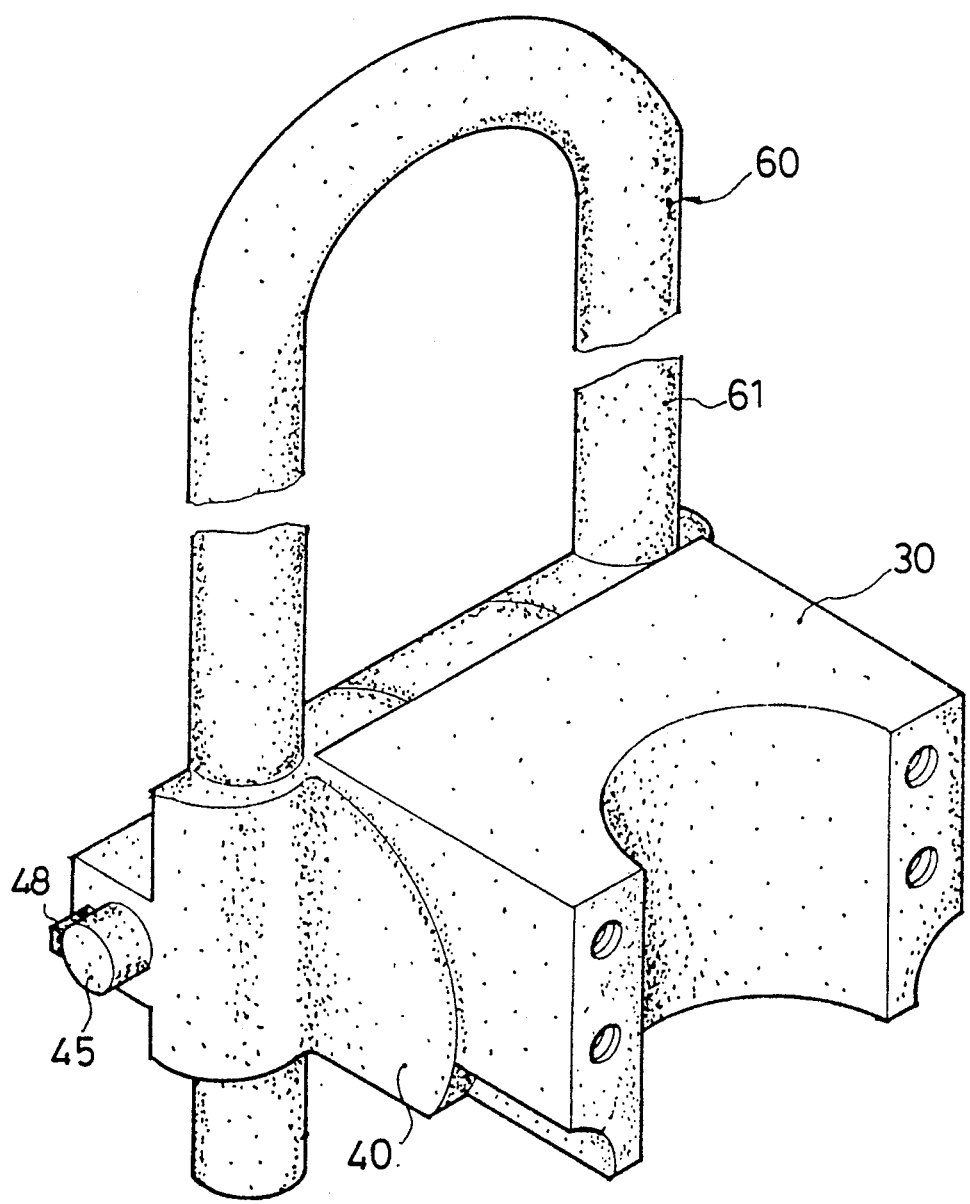
FIG. 6 is a partial perspective view of the lock mechanism, in which the frame is retained in a non-lock position.

Therefore, the legs 61 of the frame 60 are stably maintained at the position as shown in FIG. 6, and are parallel to the limbs 91, 92 of the motorcycle 90 so that the front wheel of the motorcycle is free to rotate. The lock mechanism 10 does not need to be removed from the limbs 91, 92.

When it is required to lock the front wheel, it is only required to depress the latch pin 45 into the key hole 41 so that the supports 40, 50 are rotatable about the shaft 42 and so that the legs 61 of the frame 60 are slidable along the holes 44, 54. The notches 63 (FIG. 7) formed in the free ends of the legs 61 allow the legs 61 to be locked by the latch part 20 (FIG. 2).

Accordingly, the lock mechanism in accordance with the present invention can be fixed to the limbs 91, 92 of the motorcycle 90 when the motorcycle moves and does not need to be removed from the limbs 91, 92. In addition, the lock mechanism can be easily operated by only depressing the latch pin 45 into the key hole 41. This is very convenient for user.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A lock mechanism for a vehicle, said vehicle having a wheel rotatably coupled to a fork portion, said fork portion having a pair of limbs; said lock mechanism comprising a latch part and a block fixed to said limbs of said fork portion respectively, an aperture and a recess being formed in parallel in a seat which is integrally fixed to said block; a pair of supports being coupled together by a shaft which is rotatably supported within said aperture so that said supports are rotatable about said shaft, a hole being vertically formed in each of said supports for slidably receiving a pair of legs of a U-shaped frame, a first notch being formed in one of said legs, a key hole being laterally formed in a first support of said supports and being arranged in parallel to an axis of said shaft, said key hole being intersected with said hole of said first support, a distance between said key hole and said shaft being equal to a distance between said aperture and said recess so that said key hole can be aligned with said recess when said supports rotate to a suitable angle, a shoulder being formed in one end of said key hole close to said seat; a spring and a catch being received within said recess; a latch pin which has a key formed on one end portion thereof having an enlarged head engaged with said shoulder when said latch pin is slidably received within said key hole, said latch pin having a second notch; when said key hole is aligned with said recess and when said latch pin and said catch are biased by said spring, a free end of said latch pin extending outward from said key hole, said first notch of said leg being aligned with said latch pin so that said latch pin is movable laterally relative to said leg, said catch being engaged between said seat and said first support so that said supports can not rotate about said shaft, said legs being stably maintained in position in parallel to said limbs so that said wheel is free to rotate; and when said latch pin is depressed into said key hole, said catch being pushed inward and received within said recess so that said supports are rotatable about said shaft, said second notch being aligned with said hole of said first support so that said legs of said frame are slidable along said holes, and a free end of said legs being engageable with said latch part and can be locked by said latch part so that said wheel can not rotate.

* * * * *